(12) United States Patent
Huber et al.

(10) Patent No.: US 11,583,815 B2
(45) Date of Patent: Feb. 21, 2023

(54) PROCESS AND APPARATUS FOR ADJUSTING THE FILLING LEVEL IN A FLOATING BED REACTOR

(71) Applicant: SynCraft Engineering GmbH, Schwaz (AT)

(72) Inventors: Marcel Huber, Polling (AT); Jan Krueger, Wildschönau (AT); Georg Kreutner, Hart i.Z. (AT)

(73) Assignee: SYNCRAFT ENGINEERING GMBH, Schwaz (AT)

( * ) Notice: Subject to any disclaimer, the term of this patent is extended or adjusted under 35 U.S.C. 154(b) by 191 days.

(21) Appl. No.: 17/092,550

(22) Filed: Nov. 9, 2020

(65) Prior Publication Data

US 2021/0138419 A1 May 13, 2021

(30) Foreign Application Priority Data

Nov. 8, 2019 (EP) .................................... 19208115

(51) Int. Cl.
*B01J 8/24* (2006.01)
*B01J 8/00* (2006.01)

(52) U.S. Cl.
CPC .............. *B01J 8/0015* (2013.01); *B01J 8/24* (2013.01)

(58) Field of Classification Search
CPC ........ B01J 8/0015; B01J 8/24; C10J 2200/15; C10J 3/723; C10J 3/82; C10J 3/523; Y02E 50/10; Y02P 20/145
USPC ....................................................... 422/110
See application file for complete search history.

(56) References Cited

U.S. PATENT DOCUMENTS

2010/0095592 A1* 4/2010 Huber ...................... C10J 3/725
48/197 R

FOREIGN PATENT DOCUMENTS

| CN | 209490802 U | 10/2019 |
|---|---|---|
| DE | 10 2007 012 452 A1 | 9/2008 |
| EP | 2 862 914 A1 | 4/2015 |
| EP | 2 886 190 A1 | 6/2015 |
| GB | 965 709 A | 8/1964 |
| GB | 1 577 625 A | 10/1980 |
| WO | 2008/110383 A2 | 9/2008 |

OTHER PUBLICATIONS

European Search Report for European Patent Application No. 19 20 8115, dated Apr. 14, 2020, 3 pages.
(Continued)

*Primary Examiner* — Huy Tram Nguyen
(74) *Attorney, Agent, or Firm* — Westman, Champlin & Koehler, P.A.

(57) ABSTRACT

A process for adjusting filling level in a gasifier for carbonaceous material in the form of a floating bed reactor in which biomass and/or coke (K) is transformed into a product gas includes providing a substantially conical, downwardly tapering floating bed reactor comprising an upper reactor ceiling a lower inlet opening into which biomass and/or coke (K) are introduced into the floating bed reactor from below and a gaseous gasification agent (V) is introduced upwardly, so that a fixed bed, which is elevated from the location of the inlet opening and held in suspension, forms within the conical reactor, wherein the flow rate of the gaseous gasification agent (V) together with the biomass and/or the coke (K) is adapted in such a way that a stable bed forms in the reactor.

19 Claims, 2 Drawing Sheets

(56) References Cited

OTHER PUBLICATIONS

Dietmar Schulze, "Powder and Bulk Materials: Flow Properties and Handling", published on Dec. 12, 2008 by Springerverlag, 4 pages.

* cited by examiner

PROCESS AND APPARATUS FOR ADJUSTING THE FILLING LEVEL IN A FLOATING BED REACTOR

CROSS-REFERENCE TO RELATED APPLICATION

This application claims priority to European Patent Application No. 19 20 8115.6, filed on Nov. 8, 2019, the content of which is hereby incorporated by reference in its entirety.

FIELD OF THE INVENTION

The present invention relates to an apparatus as well as a process for adjusting the filling level or filling height in a gasifier for carbonaceous material, in particular a floating bed gasifier or floating bed reactor. In particular, the present invention relates to a process for discharging particles from a floating bed gasifier with which the filling level or filling height of the bed held in suspension can be adjusted or defined.

In the context of the present application, a floating bed or floating fixed bed is a fixed bed acting against gravity, which floats by the incoming gas flow, i.e. a fixed bed raised from the gas inlet, which, in contrast to a fluidized bed contains bulk material capable of transmitting shear stresses and thus has an internal angle of friction of $>>0°$, preferably between 35° and 50°. In addition, the floating fixed bed is operated below its bulk-mechanical flow limits and is therefore considered to be a stable fixed bed held in suspension. If a floating fixed bed is operated above its flow limit, it becomes unstable and thus passes from a floating fixed bed to a fluidized bed.

STATE OF THE ART

DE 10 2007 012 452 A1 discloses an apparatus for the gasification of organic substances in a floating bed. The floating bed gasification describes a staged gasification process in which, preferably after pyrolysis or charring of a carbonaceous material to a type of coke, the produced coke together with a pyrolysis gas is gasified as completely as possible in a floating bed reactor into a so-called product gas. The product gas is also called lean gas or synthesis gas. Such a floating bed reactor comprises a substantially truncated cone-shaped widening area adjoining an inlet, which area merges into a cylindrical section provided with an outlet at the end. This body contains a fixed bed which is held in suspension by the inflow of a gasification agent and which is formed from coke from the preceding pyrolysis process. This coke is held in suspension in an elevated, lift or raised position by an appropriate introduction and dosing of a gasification agent, such as air, and is continuously transformed or gasified into a product gas.

In order to adjust the filling level, i.e. the height of the floating bed or the position of an upper boundary layer of the floating bed in a fixed floating bed gasifier, a discharge unit in the form of an overflow in the upper area of the floating bed reactor is known, for example, from FIG. 5 of WO 2008/110383 and discussed in more detail below with reference to FIG. 1 of the present application.

This known discharge unit or overflow is, in particular, used for the removal of unwanted materials, such as ash, which are reduced to a limited extent only or not sufficiently, or not in a sufficiently short time, and are thus transformed into their gaseous form. In addition, reference is also made to EP 2 886 190, which teaches how to remove any impurities having a higher density than coke, such as stones or metal parts, from the material flow below the floating bed reactor.

The overflow in WO 2008/110383 works essentially gravimetrically, i.e. heavy particles fall downward, so that lighter materials, which are held in suspension, are not yet discharged, and thus are only discharged when they clump together into larger particles or aggregations.

EP 2 862 914 describes a system with lances in the upper part of a floating bed reactor in combination with sensors. With these lances, additional gasification agent can be introduced into an upper non-load-bearing layer of the floating bed. The term non-load-bearing layer describes the layer in which the transverse forces in the bed are no longer relevant for maintaining a stable floating fixed bed. In addition, EP 2 862 914 describes that an overflow of the floating bed reactor can be prevented if a filling level reading is provided at its upper end by a sensor. For example, a radar sensor is mentioned as an example of a filling level sensor.

SUMMARY OF THE INVENTION

It is an object of the present invention to provide a process and a corresponding apparatus for a reliable and safe long-term operation of a floating bed reactor that allow substantially simpler control or regulation.

This object is achieved with the features of the independent claims. Further preferred embodiments of the invention are claimed in the dependent claims.

The inventors of the present invention have found that the removal of material from the upper part of the floating bed has advantages with respect to stability and efficiency. According to the invention it is possible to largely dispense with, preferably, sensors and circuits associated with them. For example, material that cannot be further reduced, such as ash, is easily removed from the upper part of the floating bed by extraction, making it possible to adjust or control the upper filling level in the floating bed reactor.

Preferably, the process according to the invention is used together with the process for discharging impurities as described in the application EP 2 886 190. In other words, it is preferred that particles having a higher density than the coke material, such as stones, pebbles, grains of sand, slags, nails, screws and/or other metal particles are removed from the material flow at an early stage, so that these impurities are preferably not allowed to accumulate in the floating bed in the first place.

First of all, the present invention relates to a process with which it is in particular possible to adjust or control the filling level in a gasifier for carbonaceous material in the form of a floating bed reactor. In the floating bed reactor, biomass and/or coke is/are transformed into a product gas (lean gas or synthesis gas). Initially, an essentially conical, downward tapering floating bed reactor is provided, which has an upper reactor ceiling or an upper reactor cover and an inlet opening at the lower end. In accordance with the invention, biomass and/or coke K in the form of a gas stream is conveyed through this inlet opening into the floating bed reactor from bottom to top. In addition, a gaseous gasification agent V is also introduced into the floating bed reactor from bottom to top, i.e. against gravity. The coke K can, for example in the form of a full flow, be oriented horizontally, vertically or at any angle in between and then, together with the gasification agent V which is directed from bottom to top, be transported into the floating bed reactor. This is advantageous, for example, with regard to the separation of heavy solids, such as stones or metal particles. The process according to the invention is not limited to a specific embodiment of introducing coke K and the gasification agent V, since the process according to the invention essentially relates to the discharge of the lean gas at the upper end of the floating bed reactor. The decisive point is in the reactor, preferably at least in the conical part of the reaction, a fixed bed held in suspension is formed. This bed is preferably elevated or spaced apart from the place of the inlet opening.

The floating bed extends between a lower boundary layer and an upper boundary layer within the reactor. The distance between these boundary layers defines the thickness or depth of the floating bed and the vertical location/position of the upper boundary layer, which in the following will be referred to as the filling level.

In an equilibrium operation of a floating bed, gasification agent is introduced in exactly the amount which will keep the amount of coke in the fluidized bed reactor constant. Thus, decomposition by continuous conversion of coke into product gas and input of new pieces of bio-coke are balanced. Due to a generally inhomogeneous composition of the biomass supplied, but also due to measurement tolerances in the biomass charge and the dosing of gasification agent, this equilibrium operation can vary over time, so that, within narrow limits, the floating bed is operated intermittently in a build-up and a decomposition mode.

During the build-up operation, more coke is introduced into the reactor than is decomposed at the time. With this, the amount of gasification coke in the reactor increases. A region in the floating bed reactor is thereby continuously replaced by fresh material, with excess material from this region being incorporated into the floating bed towards the top. The filling level in the reactor thus continues to rise. In order to prevent the reactor from overflowing, the present invention provides at least one extraction pipe at its upper end, with which it is possible to extract material or particles of the floating bed, by which the filling level can be adjusted. Preferably, by this the filling level, which can be measured from above as filling height in the floating bed reactor, may be kept substantially constant.

Above the conical part of the reactor there can also be a substantially cylindrical part having a substantially constant diameter. Here, the bed held in suspension above the conical part may also form in the cylindrical part. What is essential for the formation of the floating bed is the tapered shape (downwards) or the widened shape (upwards) of the reactor and the flow rate of the gaseous gasification agent as a function of the material properties of the biomass and/or coke. Here, the flow rate is adapted to the shape of the flow cross-section of the conical reactor taking into account the material properties of the biomass and/or the coke in such a way that the bed which is held in suspension is formed. It has been found that the flow rate can easily be experimentally adapted to the conical shape and the material properties in order to achieve the desired floating bed. On the other hand, it has also been found that so far a theoretical description or empirical parameterization for describing the floating bed is not possible or not sufficiently accurately possible. However, a person skilled in the art will easily be able to form a corresponding fixed bed held in suspension by simply varying the flow rate.

A fixed bed held in suspension is fundamentally different from a known fixed bed which usually rests on a grid, or a fluidized bed which has high particle velocities in the fluidized bed. Similar to a traditional fixed bed, the floating fixed bed according to the invention has a "solid bed", i.e. the particles of the bed practically do not move. However, a bed held in suspension does not rest, in particular, on grids or other mechanical structures, but is held in suspension by the gas flow. The conical shape of the reactor is therefore not a rest for the bed, but merely a lateral support. Accordingly, the bed held in suspension can be described, for example, by means of the particle velocity of the solids.

Preferably, the particle velocity in the region of the fixed bed is close to 0 m/s. However, since the fixed bed is reduced in the course of time, as seen over an extended period of time, there is a (very) slow movement of the particles within the bed (preferably upwards), which, however, is preferably less than 1 m/s, preferably less than 0.5 m/s, preferably less than 0.2 m/s, preferably less than 0.05 m/s. Preferably this particle velocity refers to an average value of all particles of the bed.

The velocity of the gas particles or of the gas which on the one hand holds the fixed bed in suspension and also flows through the bed is preferably significantly higher, preferably higher than 2 m/s, preferably higher than 5 m/s, preferably higher than 10 m/s. Instead of the absolute values of the velocities of the particles of the bed and the gas, the relative ratio of both velocities may also be used to characterize the floating bed. For example, the gas velocity/particle velocity ratio is preferably >10, preferably >50, preferably >100. By comparison, in the case of a fluidized bed gasifier, this ratio would be in the order of 1.

The bed held in suspension may also be characterized, for example, by the fact that, to a large extent, axial mixing of solids does not take place, i.e. mixing from bottom to top or top to bottom practically does not take place within the fixed bed. Rather, in the course of gasification, the particles in the fixed bed migrate very slowly from the bottom, where they are introduced and initially form the supporting layer, to the top until they are extracted in accordance with the invention. A movement of the solid particles in the opposite direction of the gas flow, i.e. downwards, is almost non-existent.

Furthermore, the floating bed can also be described by the fact that shear forces are transmitted between the solid particles within the bed and that clearly an internal angle of friction develops of >0°, preferably >10°, preferably >20°, preferably >30°, preferably >35° and preferably <60°, for example between 35° and 50°.

The fixed bed held in suspension in the floating fixed bed reactor has as a further property preferably a bulk-mechanical horizontal load ratio Lambda ($\lambda$) of between 1 and 0, i.e. neither 1 (liquid) nor 0 (solid), according to the invention, lambda is particularly preferable between 0.3 and 0.6. For example, in the book by Dietmar Schulze entitled "Pulver und Schidttgidter: FlieJeigenschaften und Handhabung" ("Powder and Bulk Materials: Flow Properties and Handling"), published on 12 December 2008 by Springerverlag, the value $\lambda$, is defined as follows.

The positive normal stress $\sigma_v>0$ (compressive stress) acts on a bulk material element in a container filled with bulk material in a vertical direction, i.e. from above and from below. If the bulk material were to behave like a resting Newtonian liquid, the stress act in the horizontal direction would be the same as the one acting in the vertical direction (and all other directions). However, a bulk material behaves completely different from a liquid in many respects, so that analogy considerations between bulk material and liquid often lead to wrong conclusions. Due to the vertical load in the horizontal direction, a stress $\sigma_h$ sets in in the bulk material which is less than the vertical stress $\sigma_v$. The ratio of the stresses $\sigma_h$ and $\sigma_v$ is defined as the horizontal load ratio (also "horizontal stress ratio"; internationally also referred to as K): $\lambda=\sigma_h/\sigma_v$.

The process according to the invention is particularly advantageous for adjusting the height or position of the upper boundary layer or edge of the fixed bed or the upper region of the fixed bed within the reactor. In particular, gas is extracted together with particles from the reactor by means of at least one extraction pipe protruding through the reactor ceiling (or reactor cover) and projecting downward into the reactor room or reactor volume. Preferably, the length of the extraction pipe determines the position of the upper edge or upper boundary layer of the floating bed within the reactor.

According to the invention, the at least one pipe may be arranged substantially in the center of the cover. In other words, the pipe and the reactor are preferably arranged concentrically. In accordance with the invention, the pipe may also be positioned in the cover laterally offset from the center of the reactor, i.e. laterally from the central axis of the reactor. In addition, it may also be advantageous to arrange a plurality of pipes in the reactor cover for extraction. All or some of these pipes may extend equally deep or differently deep into the interior of the reactor.

A plurality of pipes extending differently deep into the reactor may be advantageous, for example, for differently adjusting the filling level inside the reactor. For example, only one of the plurality of pipes may be used for suction, whereby the filling level adapts to the length of the respective pipe that is used.

According to another embodiment of the invention, at least one pipe may be adjustable or slidable, so that the length of how far the pipe extends into the reactor can be adjusted. This may be advantageous, for example, if the reactor is operated with very different biomasses over time and the height of the floating bed is to be changed.

According to the invention, the terms 'floating bed' or 'floating fixed bed' are used synonymously. Accordingly, the terms 'floating bed gasifier' or 'floating bed reactor' or 'floating fixed bed gasifier' or 'floating fixed bed reactor' as well as 'reduction unit with a floating bed/fixed bed formed therein' or 'reduction unit with a bed/fixed bed held in suspension' are used synonymously. In other words, a floating bed can be described as a layer/bed formed as fixed bed within the gasification reactor, which is elevated from a lower inlet region, i.e. really "floats" on the gas flow in the full sense of the word, as is the case with the floating bed gasification according to the disclosure of DE 10 2007 012 452 A1 or WO 2008/110383. In particular, according to the invention, full reference is made to the basic principles of the floating bed gasifier.

Accordingly, a process according to the invention is characterized, for example, by the fact that, in the inflow of the gasification agent, carbonized biomass as fixed bed is held in suspension in the floating bed reactor and that materials present above this floating bed are substantially extracted from the top in the reactor.

However, the floating bed gasifier according to the invention is not limited to the processes for the production of a gas from biomass described in the above-mentioned publications. Rather, the process of floating bed gasification according to the invention can be applied to any appropriately treated carbonaceous solid material source. For example, due to its composition of predominantly carbonaceous material, dried sewage sludge can also be transformed without an upstream pyrolysis unit. In principle, the same also applies to a use of externally produced coal or coke in accordance with the invention. It is therefore not absolutely necessary for the operation of a floating bed reactor that a supplied biomass is already largely carbonized, although in the following we will only refer to the feeding of coke.

According to the invention, residues of the solids not transformed into gas may substantially continuously be removed without negatively affecting the amount of gas produced, its quality or the overall efficiency of a plant.

According to the invention, the produced lean gas is extracted from the floating bed reactor together with particles, whereby the extracted particles are preferably filtered out by a filter device for subsequently using the lean gas.

According to the invention, the properties of the exiting gas flow can be influenced or controlled even more specifically by feeding, by means of a lance, additional gas into the upper part of the bed held in suspension. In particular, by introducing the additional gas and extracting the particles, it is possible to influence both the quantity and the properties of the exiting gas flow from the reactor.

BRIEF DESCRIPTION OF THE FIGURES

In the following, further features and advantages of embodiments of the invention are described in more detail, with reference to a working example in comparison with a known device, by means of the drawing. The Figures show.

DETAILED DESCRIPTION OF THE FIGURES

Figure 1:
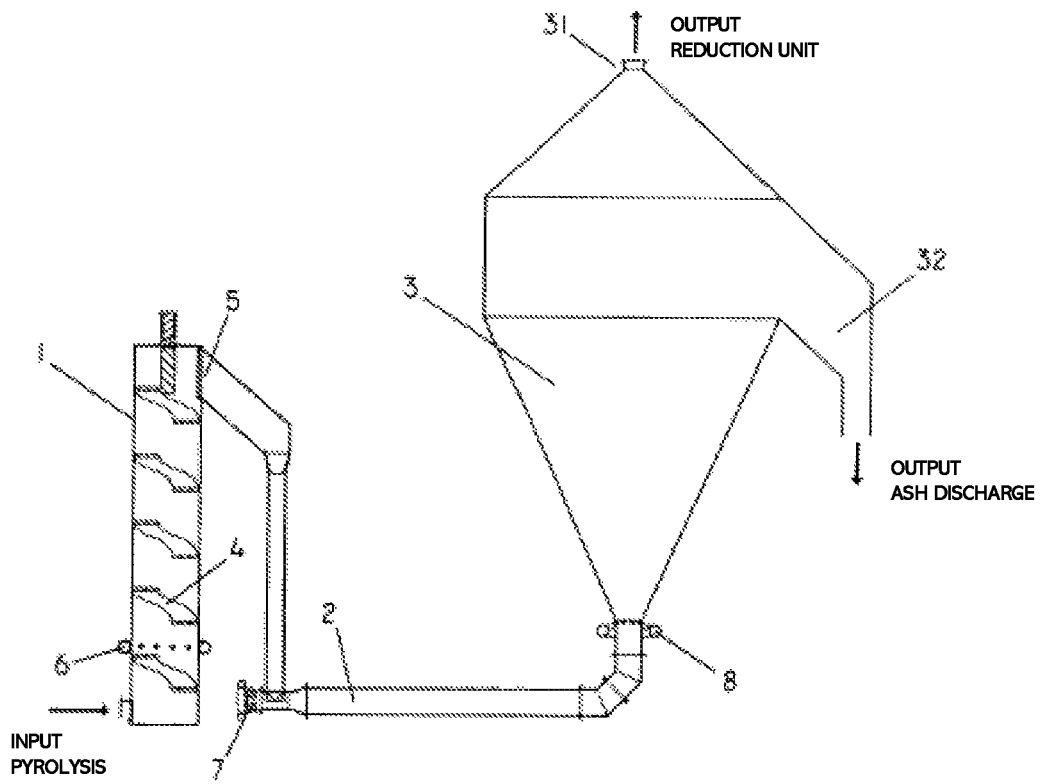
FIG. 1: a schematic view of a known reduction unit according to WO 2008/110383.

FIG. 1 shows a floating bed gasifier 3 as known from WO 2008/110383 and the corresponding patent EP 2 129 749 B1. With regard to pyrolysis unit 1, oxidation unit 2, ascending screw 4, outlet 5, gas nozzle 6 as well as nozzle units 7 and 8 shown, reference is made to the disclosure in WO 2008/110383, as the apparatus according to the invention essentially concerns the floating bed gasifier 3. In the known floating bed gasifier 3, a discharge unit or overflow 32 (see "Output ash discharge" in FIG. 1) is shown, with said discharge unit 32 being attached to the known floating bed gasifier in such a way that materials can be removed from the floating bed gasifier 3 before or below a gas outlet 31. This discharge unit 32 can be arranged annularly around the floating bed gasifier, at least in places. The discharge unit or the overflow 32 is used in particular for removing undesirable materials, such as ash or foreign bodies, from the floating bed gasifier 3. Such materials can only be reduced to a limited extent or not sufficiently, or not in a sufficiently short time, and thus be transformed into their gas form. These undesirable materials are, for example, discharged gravimetrically into the discharge unit from a predetermined or adjustable filling level of the floating bed and/or via a mechanical system (overflow).

The reduction unit or the floating bed gasifier 3 preferably has at least one outlet 31 for discharging the generated combustible gas (synthesis gas), which is also referred to as gas outlet 31 ("output reduction unit"). At the gas outlet 31 of the floating bed gasifier 3, a gas flow of the produced synthesis gas exits upwards, i.e. against gravity. After optional steps such as cooling, for example in a heat exchanger, and/or purification, this gas can be fed to a gas storage tank or combustion engine and/or used for other purposes. In this embodiment from the prior art, the upper part of the floating bed gasifier is conically tapered so that the light gas is led to the gas outlet as if from a funnel.

Figure 2:
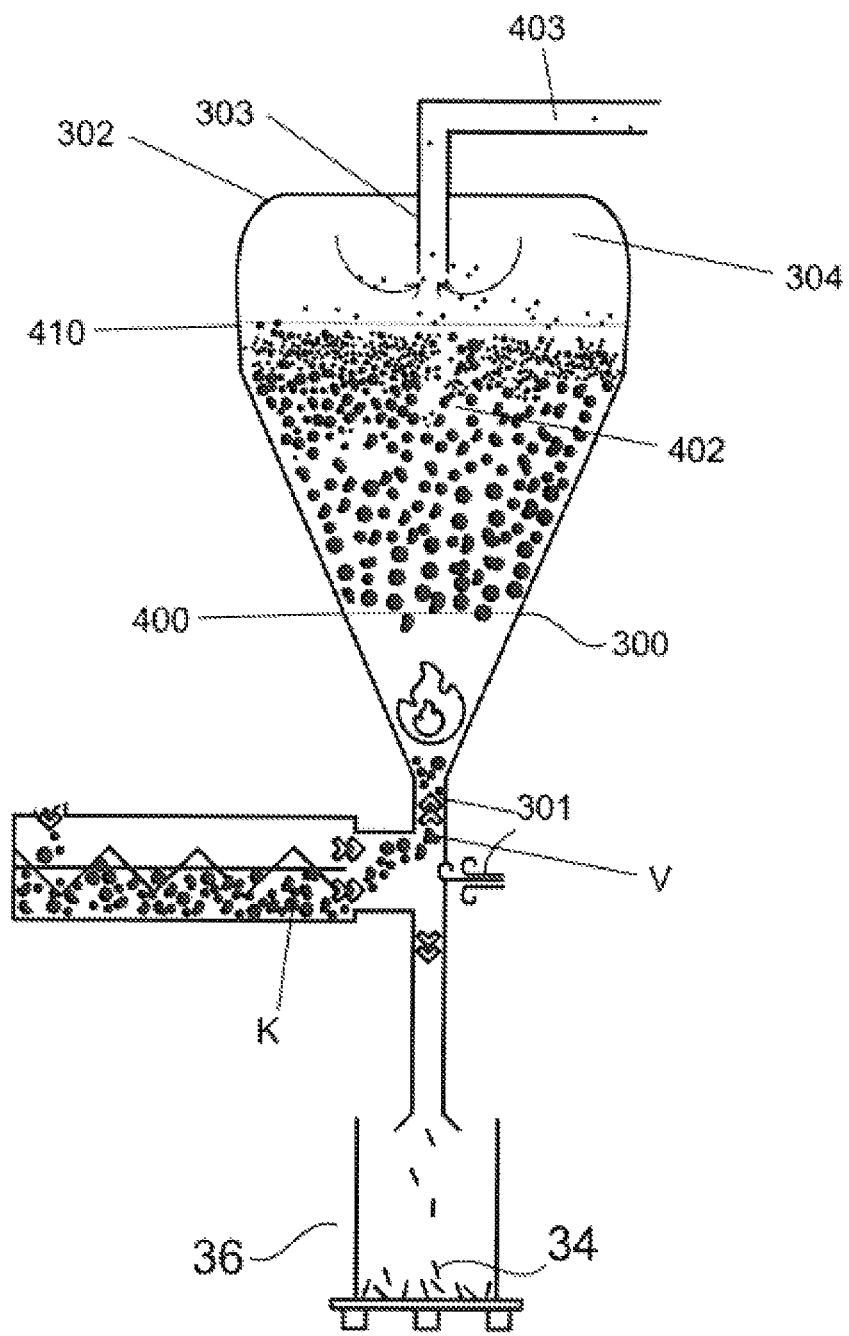
FIG. 2: a schematic view of a reduction unit with a discharge device according to the invention in the form of an extraction pipe.

FIG. 2 shows a floating bed gasifier 300 of the invention with a floating bed 402 formed therein. To form the floating bed 402, the lower part of the floating bed gasifier 300 extends substantially conically widening upwards, similar or identical to the prior art. In this embodiment, the biomass and/or the coke K is conveyed by a conveying device substantially horizontally from the left below the inlet opening 301 of the reactor. This can be done, for example, by a spiral or screw conveyor for demand-based metering. In this representation, the gaseous gasification agent V is introduced from the right side, so that the biomass/coke in the inflow of the gasification agent V is conveyed substantially vertically upwards, i.e., substantially against gravity through the inlet area 301 of the reactor into the reactor 300. However, the present invention is not limited to this special form of introduction and all conceivable embodiments of forming a floating bed are possible. For example, it is advantageous if the gasification agent V comes (vertically) from below and the biomass meets the vertically ascending gas flow of the gasification agent V laterally, i.e. horizontally or at an arbitrary angle between 0-180° to the vertical, preferably at an angle between 45° and 135°, further preferably at an angle between 70° and 110°, preferably essentially vertically (90°), in order to separate undesirable impurities at an early stage.

Preferably, the upper part of the floating-bed gasifier 300 according to the invention differs from the floating-bed gasifier 30 from FIG. 1 in that the cover 302 does not conically taper upwards but extends substantially horizontally. Since the synthesis gas produced is extracted through the pipe 303 which extends from top to bottom through the cover 302 into the interior of the gasifier 300, a conically tapering cover is not necessary. In other words, due to the fact that the gas is extracted from the interior of the gasifier 300, there is no need for a gas funnel pointing upwards.

Since, according to the invention, the synthesis gas not only flows upwards by the upwardly flowing heat but is actively extracted through the pipe 303, some of the gas that accumulates above the lower edge of the pipe 303 and below the cover 302 is also effectively extracted (see symbolic arrows in FIG. 2). In addition, material can also be actively extracted from the upper part of the formed floating bed. This has the decisive advantage that the upper filling level is effectively, and to a certain extent, automatically controllable or adjustable depending on the length of the pipe 303 protruding into the gasifier. Preferably, the upper edge (upper boundary layer) of the bed held in suspension is at approximately the same height inside the reactor as the lower end of the pipe 303. Here, it should be noted that this is not accurately represented in FIG. 2 and that the lower end of the pipe 303 is drawn too far up.

In other words, in order to be able to control the filling level in the fixed bed gasifier 300 as well as the coal production even more precisely, according to the invention, an extraction device is provided at the head of the floating bed gasifier 300 (not shown). Preferably, a pipe 303 is provided in the upper part of the floating bed gasifier 300 in such a way that particles can be extracted from the surface or boundary surface 410 of the formed floating bed 402.

This simple extraction has the advantage, for example, that it is possible to do without the complex filling level sensors and associated controls. The controlled discharge of the fine particles can, for example, further increase the stability of the floating fixed bed. Lances in the upper area can also be dispensed with, resulting in a simple yet stable control/regulation of the floating bed.

Since, according to the present invention, the produced gas is extracted together with solid particles, the solid particles are preferably filtered out in a filter system (not shown). Subsequently, after appropriate cooling and possible energy recovery and purification steps, the produced gas can be used for the operation of thermal power engines or similar devices. Alternatively, or additionally, the produced gas can be used in a further refining process, e.g., for biofuel production, or utilized, e.g., in fuel cells.

The invention claimed is:

1. A process for adjusting the filling level in a gasifier for carbonaceous material in the form of a floating bed reactor, in which biomass and/or coke (K) is transformed into a product gas, comprising the steps of:
providing a substantially conical, downwardly tapering floating bed reactor comprising an upper reactor ceiling and a lower inlet opening into which biomass and/or coke (K) are introduced into the floating bed reactor from below and a gaseous gasification agent (V) is introduced upwardly, so that a fixed bed, which is elevated from the location of the inlet opening and held in suspension, forms within the conical reactor,
wherein the flow rate of the gaseous gasification agent (V) together with the biomass and/or the coke (K) is adapted in such a way to the shape of the flow cross-section of the conical reactor taking into account the material properties of the biomass and/or the coke that a stable bed held in suspension is formed in the floating bed reactor,
wherein the filling level of the fixed bed held in suspension within the floating bed reactor is adjusted by
extracting gas, together with particles, through an extraction pipe in the reactor ceiling, which pipe protrudes downwardly into the reactor room, wherein the position of the lower end of the extraction pipe defines the upper position of the floating bed within the reactor.

2. The process according to claim 1, wherein the fixed bed has a lower boundary layer and an upper boundary layer and forms or extends between these boundary layers, the vertical position of the upper boundary layer being at substantially the same level within the reactor as the lower end of the pipe.

3. The process according to claim 1 wherein the lower boundary layer of the fixed bed is held in suspension and does not rest on grids and/or grates.

4. The process according to claim 1, wherein the extracted particles are filtered out by a filter device after extraction from the reactor.

5. The process according to claim 1, wherein the velocity of the particles forming the bed is approximately 0 m/s in the region of the fixed bed, while the particle velocity of the gas flowing through the bed held in suspension is clearly >>0 m/s.

6. The process according to claim 1, wherein there is substantially no axial mixing of solids in a fixed bed reactor with a floating bed.

7. The process according to claim 1, wherein the transmitted shear forces in the floating fixed bed are so provided that an internal friction angle of clearly >0° is formed.

8. The process according to claim 1, wherein the fixed bed held in suspension in the floating fixed bed reactor has as a characteristic a bulk-mechanical horizontal load ratio lambda between 1 and 0.

9. The process according to claim 1, wherein the upper reactor ceiling is substantially flat and horizontal.

10. The process according to claim 1, wherein additional gas is fed into the upper part by means of a lance, so that by introducing the additional gas and extracting the particles it is possible to influence both the quantity and the properties of the exiting gas flow from the reactor.

11. A system for carrying out a process according to claim 1, comprising
    a substantially conical floating bed reactor;
    means for feeding the biomass and/or the coke (K) and the gasification agent (V) into the floating bed reactor from the bottom to the top; and
    an extraction device for extracting the product gas and particles from the floating bed reactor, characterized in that
    the extraction device has at least one pipe in the cover of the floating bed reactor, which pipe extends into the interior of the floating bed reactor, through which product gas and particles are extracted from of the floating bed reactor.

12. The process according to claim 7, wherein the internal friction angle of >10° is formed.

13. The process according to claim 12, wherein the internal friction angle of >20° is formed.

14. The process according to claim 13, wherein the internal friction angle of >30° is formed.

15. The process according to claim 14, wherein the internal friction angle of >35° is formed.

16. The process according to claim 7, wherein the internal friction angle of <60° is formed.

17. The process according to claim 7, wherein the internal friction angle between 35° and 50° is formed.

18. The process according to claim 8, wherein lambda is between 0.3 and 0.6.

19. The process according to claim 10, wherein additional gas is fed into the upper third of the bed held in suspension.

* * * * *